US012511257B2

United States Patent
Ghazimatin et al.

(10) Patent No.: US 12,511,257 B2
(45) Date of Patent: Dec. 30, 2025

(54) AUDIO CONTENT SEGMENTATION AND NAMING

(71) Applicant: Spotify AB, Stockholm (SE)

(72) Inventors: Azin Ghazimatin, Berlin (DE); Ekaterina Garmash, London (GB); Ann Clifton, Brooklyn, NY (US); Paul Bennett, Kirkland, WA (US); Claudia Hauff, Delft (NL); Kristen Sheets, Somerville, MA (US); Martin Achenbach, Cologne (DE); Oguz Semerci, Cambridge, MA (US); Sahitya Mantravadi, Brooklyn, NY (US); Remi Galvez, Brooklyn, NY (US); Ofeliya Kalaydzhyan, Boston, MA (US); Divya Narayanan, New York, NY (US)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 18/809,794

(22) Filed: Aug. 20, 2024

(65) Prior Publication Data
US 2025/0355834 A1  Nov. 20, 2025

Related U.S. Application Data

(60) Provisional application No. 63/648,782, filed on May 17, 2024.

(51) Int. Cl.
G06F 16/16 (2019.01)
G06F 40/169 (2020.01)
G06F 40/205 (2020.01)

(52) U.S. Cl.
CPC .......... G06F 16/164 (2019.01); G06F 40/169 (2020.01); G06F 40/205 (2020.01)

(58) Field of Classification Search
CPC ....... G11B 27/031; G10L 15/24; G10L 15/26; G10L 25/48; G10L 15/183; G10L 15/16;
(Continued)

(56) References Cited

U.S. PATENT DOCUMENTS 11,580,737 B1 * 2/2023 Miller-Smith ...... G06F 16/7844
12,299,081 B1 * 5/2025 Asi ....................... G06F 16/345
(Continued)

FOREIGN PATENT DOCUMENTS

| CN | 113722425 A | 11/2021 |
| CN | 110929094 B | 5/2023 |
| CN | 117478927 A | 1/2024 |

OTHER PUBLICATIONS

Shtekh et al., "Exploring Influence of Topic Segmentation on Information Retrieval Quality," INSCI, 2018, St. Petersburg, Russia, Oct. 24-26, 2018, 5. Springer, pp. 131-140.
(Continued)

Primary Examiner — William P Bartlett
(74) Attorney, Agent, or Firm — McDonnell Boehnen Hulbert & Berghoff LLP

(57) ABSTRACT

Example implementations include dividing a textual transcript of digital audio content into a sequence of chunks, where the chunks are chronologically non-overlapping; determining annotations for each of the chunks, the annotations including at least one of: a title of the digital audio content, a description of the digital audio content, or one or more inferred segment titles of one or more previous segments of the digital audio content; providing, to a natural language model, a first chunk from the sequence of chunks, an associated annotation, and instructions to identify: a segment found in the first chunk, and a segment title of the segment; receiving, from the natural language model, an indication of the segment and the segment title; and storing
(Continued)

the indication of the segment and the segment title as metadata associated with the digital audio content.

20 Claims, 8 Drawing Sheets

(58) Field of Classification Search
CPC ......... G10L 25/30; G10L 15/04; G10L 25/54; G06F 40/289; G06F 16/7844
See application file for complete search history.

(56) References Cited

U.S. PATENT DOCUMENTS

| | | |
|---|---|---|
| 2015/0339288 A1 | 11/2015 | Baker |
| 2018/0300400 A1 | 10/2018 | Paulus |
| 2019/0266228 A1 | 8/2019 | Sharma |
| 2019/0362021 A1* | 11/2019 | Balduino ............... G06F 40/30 |
| 2021/0056170 A1 | 2/2021 | Bohannon |
| 2022/0171937 A1* | 6/2022 | Shen ..................... G06F 40/295 |
| 2022/0172726 A1 | 6/2022 | Garg et al. |
| 2022/0300555 A1 | 9/2022 | Yu |
| 2022/0318255 A1 | 10/2022 | Fei |
| 2022/0391591 A1* | 12/2022 | Ronen ................... G06F 16/345 |
| 2023/0359837 A1 | 11/2023 | Tanaka |
| 2023/0410793 A1 | 12/2023 | Clifton et al. |
| 2024/0404563 A1* | 12/2024 | Hyde ................. H04N 21/8549 |
| 2025/0061277 A1* | 2/2025 | Zhu ....................... G06F 40/284 |
| 2025/0190460 A1* | 6/2025 | Madisetti ............ G06F 16/3329 |
| 2025/0210037 A1* | 6/2025 | Weisz .................. G10L 15/183 |

OTHER PUBLICATIONS

Solbiati et al., "Unsupervised Topic Segmentation of Meetings with BERT Embeddings," arXiv:2106.12978v1, Jun. 24, 2021, 7 pages.
Tepper et al., "Statistical Section Segmentation in Free-Text Clinical Records," In Proceedings of the Eighth International Conference on Language Resources and Evaluation (LREC'12), 2012, pp. 2001-2008.
Vijjini et al., "Curricular Next Conversation Prediction Pretraining for Transcript Segmentation," Findings of the Association for Computational Linguistics: EACL 2023, pp. 2597-2607.
Wagner et al., "Topical Segmentation of Spoken Narratives: A Test Case on Holocaust Survivor Testimonies," Proceedings of the 2022 Conference on Empirical Methods in Natural Language Processing, 2022, pp. 6809-6821.
Wang et al., "Learning to Rank Semantic Coherence for Topic Segmentation," Proceedings of the 2017 Conference on Empirical Methods in Natural Language Processing, 2017, pp. 1340-1344.
Wang et al., "Linformer: Self-Attention with Linear Complexity," arXiv:2006.04768v3, Jun. 14, 2020, 12 pages.
Xia et a., "Dialogue Topic Segmentation via Parallel Extraction Network with Neighbor Smoothing," Proceedings of the 45th International ACM SIGIR Conference on Research and Development in Information Retrieval, 2022, pp. 2126-2131.
Xing et al., "Improving Unsupervised Dialogue Topic Segmentation with Utterance-Pair Coherence Scoring," Proceedings of the 22nd Annual Meeting of the Special Interest Group on Discourse and Dialogue, 2021, pp. 167-177.
Xing et al., "Multi-Modal Video Topic Segmentation with Dual-Contrastive Domain Adaptation," International Conference on Multimedia Modeling, arXiv:2312.00220v1, Nov. 30, 2023, 14 pages.
Yang et al., "VidChapters-7M: Video Chapters at Scale," 37th Conference on Neural Information Processing Systems (NeurIPS 2023) Track on Datasets and Benchmarks, 2024, 17 pages.
Yu et al., "Improving Long Document Topic Segmentation Models With Enhanced Coherence Modeling," Proceedings of the 2023 Conference on Empirical Methods in Natural Language Processing, 2023, pp. 5592-5605.
Zhang et al., "BERTScore: Evaluating Text Generation with BERT," published as a conference paper at ICLR 2020, arXiv:1904.09675v3, Feb. 24, 2020, 43 pages.
Zhang et al., "Outline Generation: Understanding the Inherent Content Structure of Documents," Proceedings of the 42nd International ACM SIGIR Conference on Research and Development in Information Retrieval, 2019, pp. 745-754.
Zhang et al., "PEGASUS: Pre-training with extracted gap-sentences for abstractive summarization," Proceedings of the 37th International Conference on Machine Learning (PMLR) 2020, pp. 11328-11339, vol. 119.
Zhang et al., Sequence Model with Self-Adaptive Sliding Window for Efficient Spoken Document Segmentation, IEEE Automatic Speech Recognition and Understanding Workshop 2021, IEEE, arXiv:2107.09278v2, Oct. 9, 2021, 8 pages.
Zhong et al., QMSum: A New Benchmark for Query-based Multi-domain Meeting Summarization, arXiv:2104.05938v1, Apr. 13, 2021, 17 pages.
Ann Clifton, Sravana Reddy, Yongze Yu, Aasish Pappu, Rezvaneh Rezapour, Hamed Bonab, Maria Eskevich, Gareth Jones, Jussi Karlgren, Ben Carterette, and Rosie Jones. 2020. 100,000 Podcasts: A Spoken English Document Corpus. In Proceedings of the 28th International Conference on Computational Linguistics, pp. 5903-5917, Barcelona, Spain (Online). International Committee on Computational Linguistics.
Karlbom, Hannes. Abstractive Summarization of Podcast Transcriptions. 2021, https://urn.kb.se/resolve?urn=urn:nbn:se:uu:diva-443377.
Achiam et al., "Gpt-4 Technical Report," OpenAI (2023), arXiv:2303.08774v6, Mar. 4, 2024, 100 pages.
Alemi et al., "Text Segmentation based on Semantic Word Embeddings," arXiv:1503.05543V1, KDD'15, Sydney, Australia, Mar. 18, 2015, 10 pages.
Arnold et al., "SECTOR: A Neural Model for Coherent Topic Segmentation and Classification," Transactions of the Association for Computational Linguistics, 2019, pp. 169-184, vol. 7.
Bai et al., "SegFormer: A Topic Segmentation Model with Controllable Range of Attention," The Thirty-Seventh AAAI Conference on Artificial Intelligence, (AAAI-23), 2023, pp. 12545-12552, vol. 37.
Beltagy et al., "Longformer: The Long-Document Transformer," arXiv:2004.05150v2, Dec. 2, 2020, 17 pages.
Bertsch et al., "Unlimiformer: Long-Range Transformers with Unlimited Length Input," 37th Conference on Neural Information Processing Systems (NeurIPS 2023), arXiv:2305.01625v3, Oct. 30, 2023, 22 pages.
Chang et al., "BooookScore: A Systematic Exploration of Book-Length Summarization in the Era of LLM," published as conference paper at ICLR 2024, arXiv:2310.00785V4, Apr. 13, 2024, 35 pages.
Chelba et al., "Retrieval and Browsing of Spoken Content," IEEE Signal Processing Magazine, 2008, pp. 39-49, vol. 25, No. 3.
Cho et al., "Toward Unifying Text Segmentation and Long Document Summarization," Proceedings of the 2022 Conference on Empirical Methods in Natural Language Processing, 2022, pp. 106-118.
Choi, Freddy YY, "Advances in domain independent linear text segmentation," Proceedings of the 1st North American chapter of the Association for Computational Linguistics Conference, 2000, pp. 26-33.
Choromanski et al., "Rethinking Attention with Performers," published as conference paper at ICLR 2021, arXiv:2009.14794v4, Nov. 19, 2022, 38 pages.
Eisenstein et al., "Bayesian Unsupervised Topic Segmentation," Proceedings of the 2008 Conference on Empirical Methods in Natural Language Processing, 2008, pp. 334-343.
Galley et al., "Discourse Segmentation of Multi-Party Conversation," Proceedings of the 41st Annual Meeting of the Association for Computational Linguistics, 2003, pp. 562-569.
Gao et al., "Unsupervised Dialogue Topic Segmentation with Topic-aware Utterance Representation," arXiv:2305.02747v1, Proceedings of the 46th International ACM SIGIR Conference on Research and Development in Information Retrieval, 2023, pp. 2481-2485.
Ge et al., In-context Autoencoder for Context Compression in a Large Language Model, published as a conference paper at ICLR 2024, arXiv:2307.06945v4, May 8, 2024, 17 pages.

(56) References Cited

OTHER PUBLICATIONS

Ghinassi et al., "Multimodal Topic Segmentation of Podcast Shows with Pre-trained Neural Encoder," International Conference on Multimedia Retrieval (ICMR'23), Jun. 12-15, 2023, pp. 602-606.
Ghosh et al., "Topic Segmentation in the Wild: Towards Segmentation of Semi-Structured & Unstructured Chats," 36th Conference on Neural Information Processing Systems (NeurIPS 2022), arXiv:2211.14954v1, Nov. 27, 2022, 9 pages.
Glavaš et al., "Two-Level Transformer and Auxiliary Coherence Modeling for Improved Text Segmentation," The Thirty-Forth AAAI Conference on Artificial Intelligence, 2020, pp. 7797-7804, vol. 34, No. 5.
Glavaš et al., "Unsupervised Text Segmentation Using Semantic Relatedness Graphs," Proceedings of the Fifth Joint Conference on Lexical and Computational Semantics (*SEM 2016), 2016, pp. 125-130.
Gong et al., "Tipster: A Topic-Guided Language Model for Topic-Aware Text Segmentation," International Conference on Database Systems for Advanced Applications, Springer, 2022, pp. 213-221.
Gribbons, William M., "Organization By Design: Some Implications for Structuring Information," Journal of Technical Writing and Communication, 1992, pp. 57-75, vol. 22, No. 1.
Guo et al., "LongT5: Efficient Text-To-Text Transformer for Long Sequences," Findings of the Association for Computational Linguistics: NAACL 2022, pp. 724-736.
Hearst, Marti A., "TextTiling: Segmenting Text into Multi-paragraph Subtopic Passages," Computational Linguistics, 1997, pp. 33-64, vol. 23, No. 1.
Inan et al., "Structured Summarization: Unified Text Segmentation and Segment Labeling as a Generation Task," arXiv:2209.13759v1, Sep. 28, 2022, 11 pages.
Jeong et al., "Unsupervised Document Expansion for Information Retrieval with Stochastic Text Generation," Proceedings of the Second Workshop on Scholarly Document Processing, Jun. 10, 2021, pp. 7-17.
Jones et al., "Current Challenges and Future Directions in Podcast Information Access," arXiv:2106.09227v1, Proceedings of the 44th International ACM SIGIR Conference on Research and Development in Information Retrieval, 2021, pp. 1554-1565.
Jones et al., "TREC 2020 Podcasts Track Overview," arXiv:2103.15953v1, Mar. 29, 2021, 17 pages.
Jucker, Andreas H., "Conversation: Structure or Process?" in JR Searle et al., (On) Searle on conversation, 1992, pp. 77-90.
Kitaev et al., "Reformer: The Efficient Transformer," published as a conference paper at ICLR 2020, arXiv:2001.04451v2, Feb. 18, 2020, 12 pages.
Koshorek et al., "Text Segmentation as a Supervised Learning Task," Proceedings of the 2018 Conference of the North American Chapter of the Association for Computational Linguistics: Human Language Technologies, 2018, pp. 469-473, vol. 2.
Lee et al., "Topic Segmentation Model Focusing on Local Context," arXiv:2301.01935v1, Jan. 5, 2023, 7 pages.
Li et al., "Human Guided Exploitation of Interpretable Attention Patterns in Summarization and Topic Segmentation," Proceedings of the 2022 Conference on Empirical Methods in Natural Language Processing, 2022, pp. 10189-10204.
Li et al., "SEGBOT: A Generic Neural Text Segmentation Model with Pointer Network," Proceedings of the 27th International Joint Conference on Artificial Intelligence, 2018, pp. 4166-4172.
Lin et al., "Multi-Granularity Prompts for Topic Shift Detection in Dialogue," arXiv:2305.14006v1, May 23, 2023, 12 pages.
Lin, Chin-Yew, "Rouge: A Package for Automatic Evaluation of Summaries," In Text Summarization Branches Out, Association for Computational Linguistics, 2004, pp. 74-81.
Liu et al., "End-to-End Segmentation based News Summarization," Findings of the Association for Computational Linguistics: ACL 2022, pp. 544-554.
Lo et al., "Transformer over Pre-trained Transformer for Neural Text Segmentation with Enhanced Topic Coherence," Findings of the Association for Computational Linguistics: EMNLP 2021, pp. 3334-3340.
Lukasik et al., "Text Segmentation by Cross Segment Attention," Proceedings of the 2020 Conference on Empirical Methods in Natural Language Processing (EMNLP), 2020, pp. 4707-4716.
Moritz et al., "Ray: A Distributed Framework for Emerging AI Applications," Proceedings of the 13th USENIX Symposium on Operating Systems Design and Implementation, Carlsbad, CA, USA, Oct. 8-10, 2018, pp. 561-577.
Mota et al., "BeamSeg: a Joint Model for Multi-Document Segmentation and Topic Identification," Proceedings of the 23rd Conference on Computational Natural Language Learning, 2019, pp. 582-592.
Nogueira et al., "Document Expansion by Query Prediction," arXiv:1904.08375v2, Sep. 25, 2019.
Nogueira et al., "From doc2query to docTTTTTquery—An MS MARCO passage retrieval task [1] publication," https://github.com/castorini/docTTTTTquery, 2019, 3 pages.
Pan et al., "A semantically enhanced text retrieval framework with abstractive summarization," Computational Intelligence, 2023, 17 pages, e12603.
Pevzner et al., "A Critique and Improvement of an Evaluation Metric for Text Segmentation," Computational Linguistics, 2020, pp. 19-36, vol. 28, No. 1.
Reimers et al., "Sentence-BERT: Sentence Embeddings using Siamese BERT-Networks," Proceedings of the 2019 Conference on Empirical Methods in Natural Language Processing and the 9th International Joint Conference on Natural Language Processing, 2019, pp. 3982-3992.
Retkowski et al., "From Text Segmentation to Smart Chaptering: A Novel Benchmark for Structuring Video Transcriptions," arXiv:2402.17633v1, Feb. 27, 2024.
Riedl et al., "TopicTiling: a Text Segmentation Algorithm based on LDA," Proceedings of the 2012 Student Research Workshop, Association for Computational Linguistics, 2012, pp. 37-42.
Roy et al., "Efficient Content-Based Sparse Attention with Routing Transformers," Transactions of the Association for Computational Linguistics, 2021, pp. 53-68, vol. 9.
Sheikh et al., "Topic segmentation in ASR transcripts using bidirectional rnns for change detection," ASRU 2017—IEEE Automatic Speech Recognition and Understanding Workshop, Dec. 2017, pp. 512-518.
Upadhyay, Abhi, "Automatically generating video chapter titles with AI," https://www.sievedata.com/blog/ai-auto-video-chapters, Mar. 7, 2023, 6 pages.
Ding et al., "GiTS: Gist-driven Text Segmentation," 2022 International Joint Conference on Neural Networks (IJCNN). IEEE, 2022, pp. 1-8.
Xia et al., "A Sequence-to-Sequence Approach with Mixed Pointers to Topic Segmentation and Segment Labeling," In Proceedings of the 29th ACM SIGKDD Conference on Knowledge Discovery and Data Mining, 2023, pp. 2683-2693.

\* cited by examiner

AUDIO CONTENT SEGMENTATION AND NAMING

CROSS-REFERENCE TO RELATED APPLICATION

This application claims priority to U.S. provisional patent application No. 63/648,782, filed May 17, 2024, which is hereby incorporated by reference in its entirety.

FIELD OF THE INVENTION

The present invention relates to the field of digital audio content. Specifically, it pertains to methods, systems, and devices for creating, processing, distributing, and managing digital audio in various formats.

BACKGROUND

Digital audio content, such as audio files that can be downloaded and/or streamed, are typically identified by one or more file names as well as optional metadata. The metadata may indicate, for example, a title, a source, and/or a description of the digital audio content. When the digital audio content is indexed for purposes of searching, the digital audio content is treated as a monolithic entity, as only this metadata (i.e., the title, source, and/or description) is available as search keywords. However, the digital audio content may have distinct segments that relate to a number of particular aspects, topics, subjects, or features that go beyond what is specified in the metadata. This limits the ability of search engines to find individual segments. Further, computing resources (e.g., processing, memory, and network capacity) are wasted when users who are playing out the digital audio content cause the playout device to fast-forward, rewind, skip, or otherwise jump around in order to locate a specific segment.

SUMMARY

Various implementations disclosed herein involve techniques for automatic segmentation of digital audio content in a semantically coherent fashion, and for determining accurate names (e.g., segment titles) for each resulting segment. Doing so brings structure to the digital audio content so that it can be efficiently indexed and searched. This enables improved content discovery and eases navigation through libraries of digital audio content. Moreover, fewer computing resources are used when users can cause their playout device to skip or jump directly to specific segments rather than try to find these segments through trial and error.

There are numerous technical challenges with segmenting digital audio content and naming the segments in a semantically accurate and efficient manner. For instance, segmentation can be subjective, as different segment boundaries can be reasonably placed in different locations. Also, different titles for these segments may be acceptable. Furthermore, textual transcripts of any spoken portions of digital audio content can be noisy and contain transcription errors.

Current segmentation technologies are either: limited to a few thousand tokens (e.g., words) and thus cannot be used with lengthy digital audio content, or separate the segmentation and naming tasks into two distinct stages, which prevents the sharing of information between these tasks. The implementations herein overcome these technical deficits by processing a transcript of the digital audio content in non-overlapping chunks. Each chunk may contain text from one or more segments that are yet to be identified as well as text from previously-identified segments.

Each of the chunks may be augmented by labeling (e.g., pre-pending or post-pending) each sentence therein with a unique index number. Each chunk may also be enhanced with further contextual information, such as the title, source, description, and/or the titles of one or more previously-identified segments. The resulting augmented chunk may be provided to a natural language model (e.g., a large language model) with a prompt that requests that the natural language model infer where any segment breaks appear in the chunk and to suggest a segment title for each inferred segment.

This procedure provides a number of technical advantages. For instance, dividing the digital audio content into chunks allows use of natural language models that have restrictions on input size. Also, including the use of the additional context (e.g., the chunks as augmented) of the digital audio content to determine the segment titles results in improved consistency of segment titles between segments, as the natural language model is aware of the segment titles it has suggested in the past.

Accordingly, a first example embodiment may involve dividing a textual transcript of digital audio content into a sequence of chunks, wherein the chunks are chronologically non-overlapping. The first example embodiment may also involve determining annotations for each of the chunks, the annotations including at least one of: a title of the digital audio content, a description of the digital audio content, or one or more inferred segment titles of one or more previous segments of the digital audio content. The first example embodiment may also involve providing, to a natural language model, a first chunk from the sequence of chunks, an associated annotation for the first chunk, and instructions to identify: a segment found in the first chunk, and a segment title of the segment. The first example embodiment may also involve receiving, from the natural language model, an indication of (i) the segment found in the first chunk and (ii) the segment title of the segment found in the first chunk. The first example embodiment may also involve storing the indication of the segment and the segment title as metadata associated with the digital audio content.

A second example embodiment may involve a non-transitory computer-readable medium, having stored thereon program instructions that, upon execution by a computing system, cause the computing system to perform operations in accordance with any previous example embodiment.

In a third example embodiment, a computing system may include at least one processor, as well as memory and program instructions. The program instructions may be stored in the memory, and upon execution by the at least one processor, cause the computing system to perform operations in accordance with any previous example embodiment.

In a fourth example embodiment, a system may include various means for carrying out each of the operations of any previous example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein. Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Unless clearly indicated otherwise herein, the term "or" is to be interpreted as the inclusive disjunction. For example, the phrase "A, B, or C" is true if any one or more of the arguments A, B, C are true, and is only false if all of A, B, and C are false.

I. Example Media Content Delivery System

Figure 1:
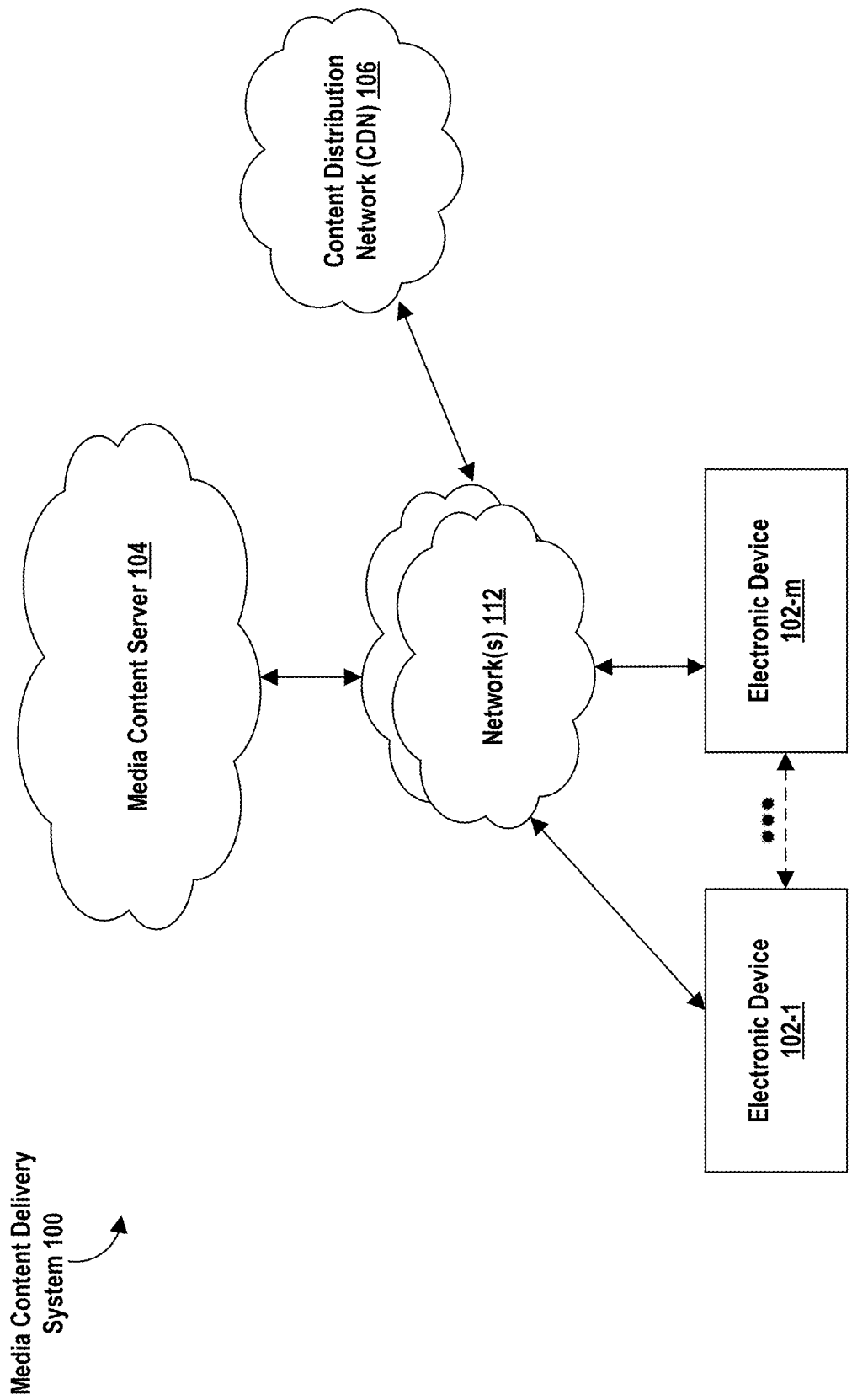
FIG. 1 is a block diagram illustrating a media content delivery system, in accordance with example embodiments.

FIG. 1 is a block diagram illustrating a media content delivery system 100, in accordance with some embodiments. The media content delivery system 100 includes one or more electronic devices 102 (e.g., electronic device 102-1 to electronic device 102-m, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicatively couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, infotainment system, digital media player, speaker, television (TV), and/or any other electronic device capable of presenting media content (e.g., controlling playback of media items, such as music tracks, podcasts, videos, etc.). Electronic devices 102 may connect to each other wirelessly and/or through a wired connection (e.g., directly through an interface, such as an HDMI interface). In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play music, podcasts, movies, videos, or other media items, or playlists thereof) to media content server 104 through network(s) 112. Additionally, electronic devices 102-1 and 102-m, in some embodiments, also send indications of media content items (and possibly the media content items) to media content server 104 through network(s) 112. In some embodiments, the media content items are uploaded to electronic devices 102-1 and 102-m before the electronic devices forward the media content items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222 (FIG. 2) that allows a respective user of the respective electronic device to upload (e.g., to media content server 104), browse, request (e.g., for playback at the electronic device 102), and/or present media content (e.g., control playback of music tracks, playlists, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, audiobooks, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice application programming interface (API), a connect API, and/or a key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
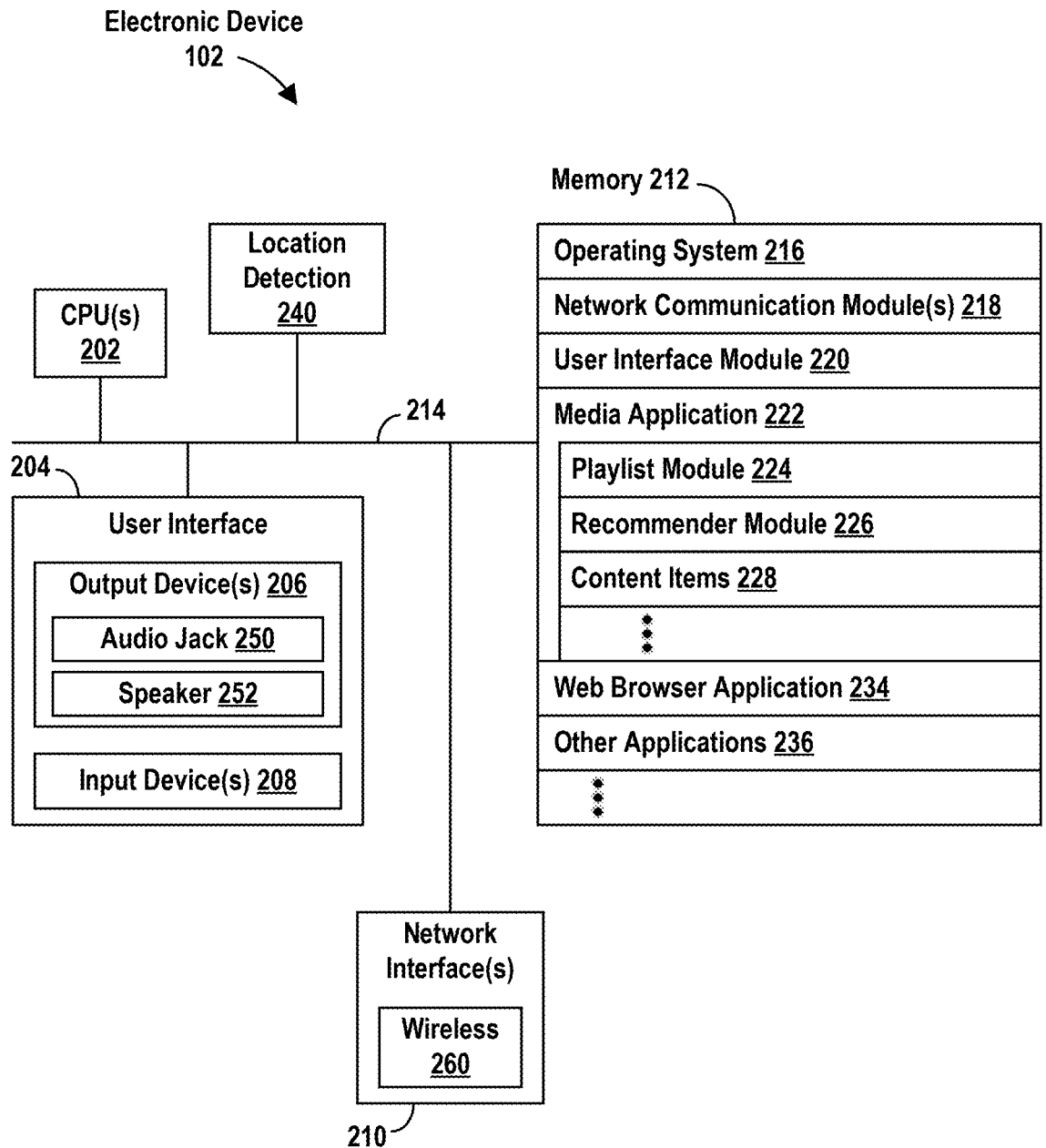
FIG. 2 is a block diagram illustrating an electronic device, in accordance with example embodiments.

FIG. 2 is a block diagram illustrating an electronic device 102 (e.g., electronic device 102-1 and/or electronic device 102-m, FIG. 1) in accordance with some embodiments. The electronic device 102 includes one or more central processing units (CPU(s) 202, i.e., processors or cores), one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are conducted using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are conducted using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems, and/or or other wireless (e.g., Bluetooth-compatible) devices (e.g., for streaming audio data to the media presentations system of an automobile). Furthermore, in some embodiments, the wireless interface 260 (or a different communications interface of the one or more network interfaces 210) enables data communications with other WLAN-compatible devices (e.g., a media presentations system) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof: an operating system 216, network communication module(s) 218, a user interface module 220, a media application 222, a web browser application 234, and other applications 236.

The operating system 216 may include procedures for handling various basic system services and for performing hardware-dependent tasks. Network communication module(s) 218 may connect the electronic device 102 to other computing devices (e.g., media presentation system(s), media content server 104, and/or other client devices) via the one or more network interface(s) 210 (wired or wireless) connected to one or more network(s) 112. The user interface module 220 may receive commands and/or inputs from a user via the user interface 204 (e.g., from the input devices 208) and provides outputs for playback and/or display on the user interface 204 (e.g., the output devices 206). Media application 222 (e.g., an application for accessing a media-providing service of a media content provider associated with media content server 104) may provide uploading, browsing, receiving, processing, presenting, and/or requesting playback of media (e.g., media items).

In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof: a playlist module 224, a recommender module 226, and a content items module 228.

The playlist module 224 may store sets of media items for playback in a predefined order. In some embodiments, the playlist module 224 is configured to generate playlists. In some embodiments, the playlist module 224 includes a diffusion model component, a large language model component, and/or a nearest neighbor search component. The recommender module 226 may identify and/or display recommended media items (e.g., to include in a playlist). In some embodiments, the recommender module 226 includes a diffusion model component, a large language model component, and/or a nearest neighbor search component. The content items module 228 may store media items, including audio items such as podcasts and songs, for playback and/or for forwarding requests for media content items to the media content server. In some embodiments, the content item module 228 includes a set of vector representations for the media items.

The web browser application 234 may access, view, and interact with web sites. In doing so, the web browser application 234 may using web-based communication protocols, web-based applications, and/or web-based content formats.

The other applications 236 may include applications for word processing, calendaring, mapping, weather, time keeping, virtual digital assistant, presenting, drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
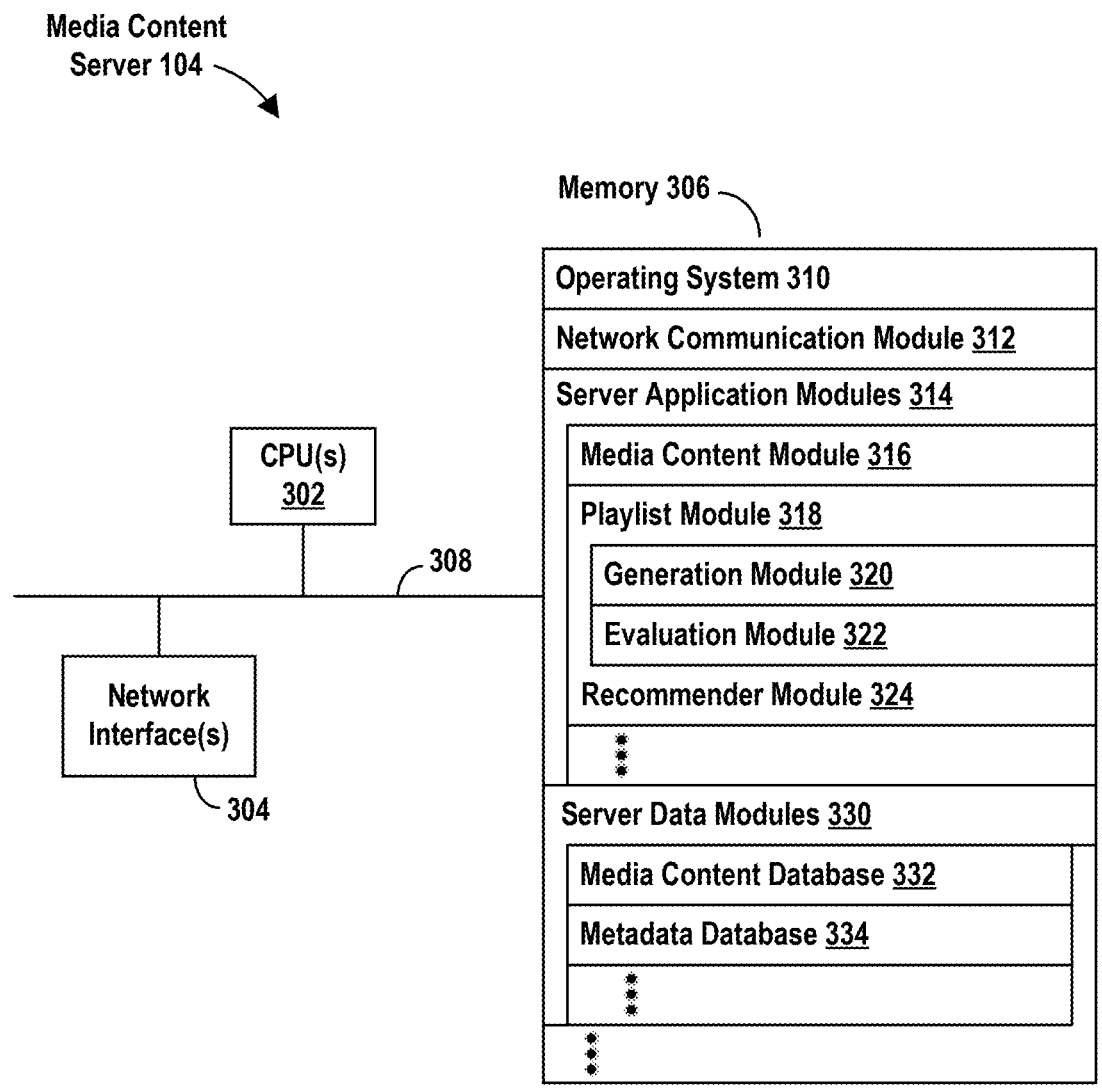
FIG. 3 is a block diagram illustrating a media content server, in accordance with example embodiments.

FIG. 3 is a block diagram illustrating a media content server 104 in accordance with some embodiments. The media content server 104 typically includes one or more CPUs 302, one or more network interfaces 304, memory 306, and one or more communication buses 308 for interconnecting these components.

Memory 306 includes high-speed random-access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof: an operating system 310, a network communication module 312, one or more server application modules 314, and one or more server data module(s) 330.

The operating system 310 may include procedures for handling various basic system services and for performing hardware-dependent tasks.

The network communication module 312 may be used for connecting the media content server 104 to other computing devices via one or more network interfaces 304 (wired or wireless) connected to one or more networks 112.

The one or more server application modules 314 may perform various functions with respect to providing and managing a content service, the server application modules 314 including, but not limited to, one or more of: a media content module 316, a playlist module 318, and a recommender module 324.

The media content module 316 may store one or more media content items and/or send (e.g., stream), to the electronic devices, one or more requested media content item(s).

The playlist module 318 may be for storing and/or providing (e.g., streaming) sets of media content items (e.g., to the electronic devices 102). In some embodiments, the playlist module 318 includes one or more of: a generation module 320 for generating playlists and media sets and an evaluation module 322 for evaluating the playlists and media sets, e.g., before and after publication. In some embodiments, the playlist module 318 includes a diffusion model component, a large language model component, and/or a nearest neighbor search component.

The recommender module 324 may determine and/or provide media item recommendations (e.g., for a playlist). In some embodiments, the recommender module 324 includes a diffusion model component, a large language model component, and/or a nearest neighbor search component.

The one or more server data module(s) 330 may manage the storage of and/or access to media items and/or metadata relating to the media items. In some embodiments, the one or more server data module(s) 330 include: a media content database 332 for storing media items and/or vector representations (or other embeddings) for the media items; and a metadata database 334 for storing metadata relating to the media items, such as a genre associated with the respective media items.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous Javascript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system manages during peak usage periods as well as during average usage periods.

II. Digital Audio Content and Streaming

Digital audio content, as discussed herein, encompasses a broad range of audio data that has been converted into a digital format, enabling it to be stored, processed, transmitted, and received by electronic devices. This can include spoken word recordings, such as news broadcasts, podcasts, audiobooks, and lectures, which offer listeners a convenient way to consume information and entertainment through auditory means. Additionally, digital audio content can combine spoken word with music or other sounds, creating rich, multi-layered audio experiences commonly found in radio shows, multimedia presentations, and enhanced podcasts. Furthermore, digital audio content often constitutes the audio portion of digital video content, such as the soundtrack of movies, television shows, online videos, and live streams. This integration allows for synchronized audio-visual experiences that enhance the storytelling and engagement of visual media. Digital audio content is typically compressed using various encoding techniques (e.g., MP3, AAC, or Opus) to reduce file size while maintaining quality, and it can be distributed across a multitude of platforms, including streaming services, downloadable files, and broadcasting networks. Digital audio content may also be obtained from audio/video encodings, such as H.264/MPEG-4 or 3GP.

For instance, digital audio content streaming involves transmitting audio data from a media content server 104 to electronic devices 102 over a network 112. At the media content server 104, the process may involve content preparation, where the audio is encoded using compression algorithms (if it is not already compressed). The encoded audio is then segmented into smaller pieces, making it easier to stream continuously. These audio content pieces, along with associated metadata, are stored on the media content server 104. To facilitate delivery, the server may utilize the CDN 106, which caches the audio content pieces on geographically distributed servers, reducing latency and improving reliability. The media content server 104 may employ streaming protocols such as HTTP Live Streaming (HLS), Dynamic Adaptive Streaming over HTTP (DASH), or the Real-Time Messaging Protocol (RTMP) to transmit the audio segments. These protocols manage the data transmission and adapt to varying network conditions. Additionally, the media content server 104 handles user sessions, managing requests for specific audio streams and providing secure access through authentication and authorization mechanisms.

On the receiving end, electronic devices 102 may initiate a connection to the media content server 104 by requesting a specific audio stream. After receiving the initial audio segments, the electronic device 102 begins buffering, pre-loading a portion of the audio into memory to provide smooth playback even in the case of minor network interruptions. The buffered pieces are then decoded from their compressed format back into an audio signal by media player software of the electronic device 102. Adaptive streaming protocols, such as those discussed above, allow the electronic device 102 to monitor network conditions and request different quality levels of digital audio content based on current bandwidth availability, thus providing consistent playback without interruptions in most cases. The electronic device 102 also handles network errors and interruptions by attempting to reconnect to the media content server 104, re-buffering when necessary, and dynamically adjusting the stream quality to maintain a continuous audio experience. The decoded audio may be played through the electronic device 102 (e.g., via speakers or headphones), with the media player software managing playback controls like play, pause, skip, and volume adjustment.

III. Example Natural Language Models

As discussed above, the embodiments herein may employ natural language models. Large language models (LLMs) are one example of such a natural language model. These LLMs may operate as networked servers that take in information from a client device as a prompt and provide a semantically appropriate response as output to the client device.

In general, an LLM is an advanced computational model, primarily functioning within the domain of natural language processing and machine learning. An LLM can be configured to understand, interpret, generate, and respond to human language in a manner that is both contextually relevant and syntactically coherent. The underlying structure of an LLM is typically based on a neural network architecture, more specifically, a variant of the transformer model. Transformers are notable for their ability to process sequential data, such as text, with high efficiency.

The operation of an LLM involves layers of interconnected processing units, known as neurons, which collectively form a deep neural network. This network can be trained on vast datasets comprising text from diverse sources, thereby enabling the LLM to learn a wide array of language patterns, structures, and colloquial nuances for prose, poetry, and program code. The training process involves adjusting the weights of the connections between neurons using algorithms such as backpropagation, in conjunction with optimization techniques like stochastic gradient descent, to minimize the difference between the LLM's output and expected output.

An aspect of an LLM's functionality is its use of attention mechanisms, particularly self-attention, within the transformer architecture. These mechanisms allow the model to weigh the importance of different parts of the input text differently, enabling it to focus on relevant aspects of the data when generating responses or analyzing language. The self-attention mechanism facilitates the model's ability to generate contextually relevant and coherent text by understanding the relationships and dependencies between words or tokens in a sentence (or longer parts of texts), regardless of their position.

Upon receiving an input, such as a text query or a prompt, the LLM may process this input through its multiple layers, generating a probabilistic model of the language therein. It predicts the likelihood of each word or token that might follow the given input, based on the patterns it has learned during its training. The model then generates an output, which could be a continuation of the input text, an answer to a query, or other relevant textual content, by selecting words or tokens that have the highest probability of being contextually appropriate.

Furthermore, an LLM can be fine-tuned after its initial training for specific applications or tasks. This fine-tuning process involves additional training (e.g., with reinforcement from humans), usually on a smaller, task-specific dataset, which allows the model to adapt its responses to suit particular use cases more accurately. This adaptability makes LLMs highly versatile and applicable in various domains, including but not limited to, chatbot development, content creation, language translation, and sentiment analysis.

Some LLMs are multimodal in that they can receive prompts in formats other than text and can produce outputs in formats other than text. Thus, while LLMs are predominantly designed for understanding and generating textual data, multimodal LLMs extend this functionality to include multiple data modalities, such as visual and auditory inputs, in addition to text.

A multimodal LLM can employ an advanced neural network architecture, often a variant of the transformer model that is specifically adapted to process and fuse data from different sources. This architecture integrates specialized mechanisms, such as convolutional neural networks for visual data and recurrent neural networks for audio processing, allowing the model to effectively process each modality before synthesizing a unified output.

The training of a multimodal LLM involves multimodal datasets, enabling the model to learn not only language patterns but also the correlations and interactions between different types of data. This cross-modal training results in multimodal LLMs being adept at tasks that require an understanding of complex relationships across multiple data forms, a capability that text-only LLMs do not possess. This makes multimodal LLMs particularly suited for advanced applications that necessitate a holistic understanding of multimodal information, such as chatbots that can interpret and produce images and/or audio.

IV. Segmentation and Titling of Digital Audio Content

As discussed above, digital audio content may include audio from a wide variety of sources that serve a wide variety of functions. For sake of simplicity, the emphasis of the embodiments herein is on audio in the form of podcasts. Nonetheless, these embodiments may apply to other non-podcast forms of digital audio content, including any type of spoken audio content such as from terrestrial or satellite radio, interviews, soundtracks to videos, and so on.

Podcasts are digital audio content made available for streaming or download, typically organized as a series of episodes centered on specific themes or topics. Each podcast episode is an audio recording that can include spoken word, music, sound effects, and other audio elements. Podcasting refers to the process of creating and distributing this digital audio content.

The creation of a podcast involves recording digital audio content using microphones and audio editing software to produce episodes with high-fidelity sound. Once recorded, the digital audio content (typically in the form of one or more audio files) is encoded in a compressed format to reduce file size and facilitate online distribution. These files may be uploaded to a hosting platform (e.g., media content server 104).

The hosting platform in turn, may generate an RSS feed-a web-based feed that allows users to receive updates when new episodes are published. The digital audio content and/or the RSS feed may include metadata such as the podcast name, its source (e.g., originator, creator, host, or related entity), description, episode titles, and links to URLs of the audio files.

There are a wide variety of podcast episodes in terms of topics, lengths, and available metadata. Some episodes may be rather short (just a few minutes) and focus on a single topic. Other episodes may be very long (e.g., an hour or more) and have several topics of focus. Further, some episodes may be strictly structured (e.g., a news program with headlines, then weather, then sports) while others may be unstructured (e.g., open-ended discussion alternating between topics and/or added commentary unrelated to episode topic(s)).

Given this, indexing episodes based on just on their respective titles, sources, and descriptions may be insufficient to allow users to search or navigate through potentially millions of episodes in order to identify those of interest. For instance, the title and description of the podcast may not represent its content fully or accurately.

As a consequence, the utility of podcast search engines is limited by this partial knowledge of podcast episodes. Further, even if a search engine returns an episode of interest for a user to play out, computing resources (e.g., processing, memory, and network capacity) are wasted when such a user is forced to fast-forward, rewind, skip, or otherwise jump around in order to locate a specific segment within an episode.

To overcome these technical challenges, podcast episodes can be logically broken up into two or more discrete and non-overlapping segments that are focused on a specific topic, subject, theme, or semantic content. Each segment may be given a unique (within the episode) title that represents its topic, subject, theme, or semantic content. Thus, segmentation of audio content (such as podcast audio) may include the task of dividing the audio into semantically coherent, non-overlapping segments and assigning each segment an appropriate title that reflects its content. This segmentation may also be referred to as chapterization or summarization, for example.

This brings explicit structure to the episode so that each of its segments can be efficiently indexed and searched. In turn, users are provided with improved content discovery and easier navigation through libraries of podcast episodes. Additionally, fewer computing resources are used when users can skip or jump directly to specific segments rather than try to find these segments through trial and error.

Previous segmentation technologies have focused on structured written texts, such as knowledgebase or news articles. Yet, segmenting spoken language documents, particularly podcast episodes, presents unique challenges compared to segmenting short, structured texts. Spoken discourse is usually more fluid, topically diverse, and less structured, and often features frequent digressions due to its interactive, real-time, and informal nature. Thus, segmentation techniques for structured text provide poor results when applied to many forms of spoken audio.

Another challenge is the considerable length of podcast episodes, whether measured by time or word count when transcribed. Not only does this increase computational costs but it also poses a modeling challenge, as many podcasts contain long-range semantic dependencies that should to be captured by segmentation. For instance, a podcast episode may include a discussion that diverges into a tangent about traveling before returning to a main topic of exercising. Such tangents are typical of informal conversational podcasts. To provide a segmentation of such a podcast, a model may track the overarching context and theme. Being aware that the main topic is physical exercise helps the model distinguish segments about different aspects of this topic. Segmenting a written article, however, typically does not face these challenges since it is shorter and more structured.

Also, the length of podcasts have a related concern when employing certain types of natural language models to assist with segmentation. Some of these models, such as LongT5, have a content window of 16,384 (16K) tokens (words). This is not sufficient for podcast transcripts with more than 16K tokens. Some proposals to overcome this limit separate the segmentation and segment titling tasks into two distinct stages, but doing so prevents the sharing of information between these tasks and results in poor segmentation and titling outcomes. Employing a sufficiently large natural language model (e.g., an LLM with a context window much greater than 16K tokens) might be able to process an entire podcast episode's transcript and produce accurate segments. However, using such an LLM (which may include over 1 trillion parameters) incurs significant computational costs and may not fully capture all long-distance dependencies.

The implementations herein overcome these technical deficits by employing a comparatively small LLM. Nonetheless, the disclosed implementations may also overcome other technical deficits not explicitly discussed herein.

Particularly, these implementations involve a segmentation model that dedicates a small portion of input text to explicit global context encoded as text: specifically, podcast episode metadata that reflects the overall content of the episode and previously generated segment titles. This allows a reasonably-sized LLM (e.g., less than 1 billion parameters) to handle long and unstructured content effectively. For example, this model may be based on the LongT5 encoder-decoder model, which offers a compromise between efficiency and power, or a similar model.

A possible goal or outcome of such an implementation may be an episode being divided into a sequence of semantically-coherent segments identified by the tuple <segment title, start timestamp, end timestamp>, where the segment title is the title of the segment, the start timestamp is a number of seconds into the episode at which the segment begins, and the end timestamp is a number of seconds into the episode at which the segment ends. The end timestamp is always greater than the start timestamp for each respective segment. These segments may span the whole episode and may be non-overlapping.

Once an episode's segments and segment titles are determined, this information may be associated with the episode (e.g., by way of metadata embedded into or otherwise associated with audio files containing the episode). Thus, the segment titles and/or timestamps may be available for use by search engines and viewable by users.

The implementations herein were validated by using two non-podcast datasets and one podcast dataset. The findings indicate that using global context as part of the input text enhances the quality of segment titles, particularly for longer documents in conversational datasets. Usage statistics gathered from a live podcasting platform indicate that podcast listeners find the generated segments helpful for browsing through episodes, particularly in lesser known podcasts. Additionally, adding segment titles to episode descriptions significantly enhances sparse retrieval effectiveness compared to an extractive summarization baseline.

Figure 4:
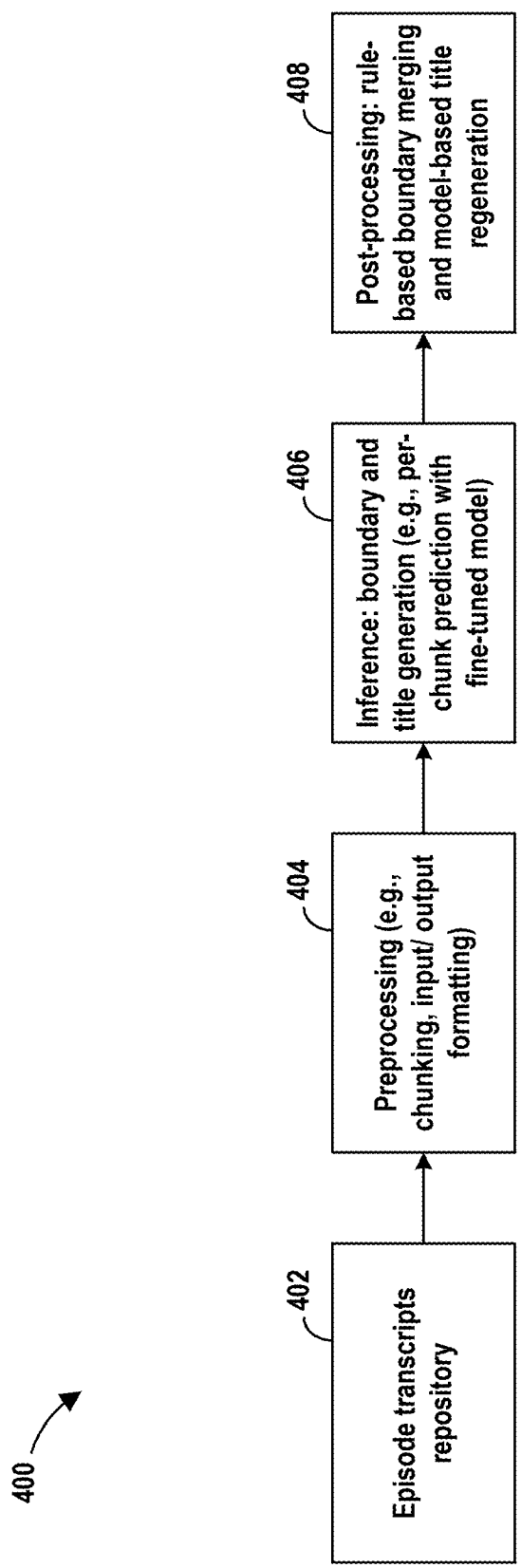
FIG. 4 is a flow chart for segmentation and titling of digital audio content, in accordance with example embodiments.

FIG. 4 depicts a three-step process 400 of segmenting a podcast episode and determining a title for each of its segments. This process may take place prior to the episode being provided to media content server 104. It is assumed that a textual transcript of the episode is available in episode transcripts repository 402. Such a transcript may be obtained by way of speech-to-text conversion (transforming spoken language into written language by recognizing phonemes in the speech and then assembling these phonemes in words based on context and grammar) operations applied to one or more audio files containing the episode. Episode transcripts repository 402 may take the form of one or more databases and/or filesystems containing episode transcripts.

This approach uses a pre-trained LLM fine-tuned on supervised data of example podcast transcripts with associated segmentations and segment titles. The LLM includes a text-based model and effectively integrates segmentation and title prediction, while also incorporating diverse contextual information to enhance the accuracy of the prediction. In some examples, the LLM may employ an encoder-decoder architecture with an underlying transformer-based LLM. As an example, an existing LLM adhering to the seq2seq API may be used, with the LongT5 pre-trained LLM is one implementation thereof.

Each training data point may consist of a chunk of input text and the corresponding output string, which includes segment boundaries and titles relevant to that chunk. If a chunk does not contain any segment boundaries, the output string can indicate as such, for example "No chapter boundaries were found." The chunking process uses a sliding non-overlapping window with a size smaller than the LLM's input capacity.

This chunking of the input can result in predictions that are locally informed and are not based on the broader context about the entire input text or about the segmentation predictions made in the preceding chunks. Given the considerable average length of podcasts and the frequent presence of long-distance dependencies, such locality may result in suboptimal segmentation and titling quality.

To address this potential issue, the approach employed herein also includes incorporating additional contextual cues, in the form of static and/or dynamic content, into this core model to improve generalization on long-input data and mitigate the limitations of the local nature of segmentation inference. The static content may include metadata outlining the overall content of the episode transcript. This is useful when the model cannot access the entire document at once.

Specific implementations depend on the domain and dataset. The dynamic content may include representation of the intermediate state of the start-to-finish segmentation process. This information provides access to earlier segmentation decisions, guiding the selection of subsequent segmentations.

A. Pre-Processing

Pre-processing step 404 may include dividing the transcript into chunks as noted. These chunks are not necessarily the content-based segments that will eventually be identified but are instead non-overlapping windows of text. The length of each chunk may be fixed or variable. An example fixed length might be 200, 500, 1000, 5000, 10,000, or more tokens. Other values are possible.

Here, tokens are the basic units of text that a natural language model processes, which can be whole words, sub-words, or characters depending on the tokenization strategy. Tokenization converts text into these units, allowing the natural language model to process and understand language efficiently by transforming tokens into numerical representations. For sake of simplicity, tokens may be considered to be words but the embodiments herein are not restricted in this manner.

The length of each chunk is limited because LLM input capacity (e.g., the context window of the LLM) is typically restricted to a few thousand tokens while podcast episodes can be arbitrarily long. For example, a given LLM may have an input limit of 16,384 tokens, while other LLMs may have shorter input limits.

The text of each chunk may be augmented by adding static content (e.g., index numbers before or after each sentence, so that the start of a segment can be identified by referring to one of those indices). Thus, an augmented chunk may include a chronologically ordered concatenation of strings of the form: <index-1, sentence-1, index-2, sentence-2, . . . , index-n, sentence-n>. As noted above, each chunk may also be augmented with the title and/or description of the episode (as well as other possible static content).

A disadvantage of local chunked processing is the model's lack of awareness of prior segmentation decisions for a given input transcript. As a result, each local prediction step may produce segment boundaries and titles that are inconsistent with previous decisions. This can lead to issues such as repetitive titles, different levels of segment granularity, and varying linguistic styles in titles. To provide dynamic information about the state of the segmentation, process a list of previously-inferred segment titles of chronologically previous chunks may be provided (as well as other possible dynamic content).

Figure 6:
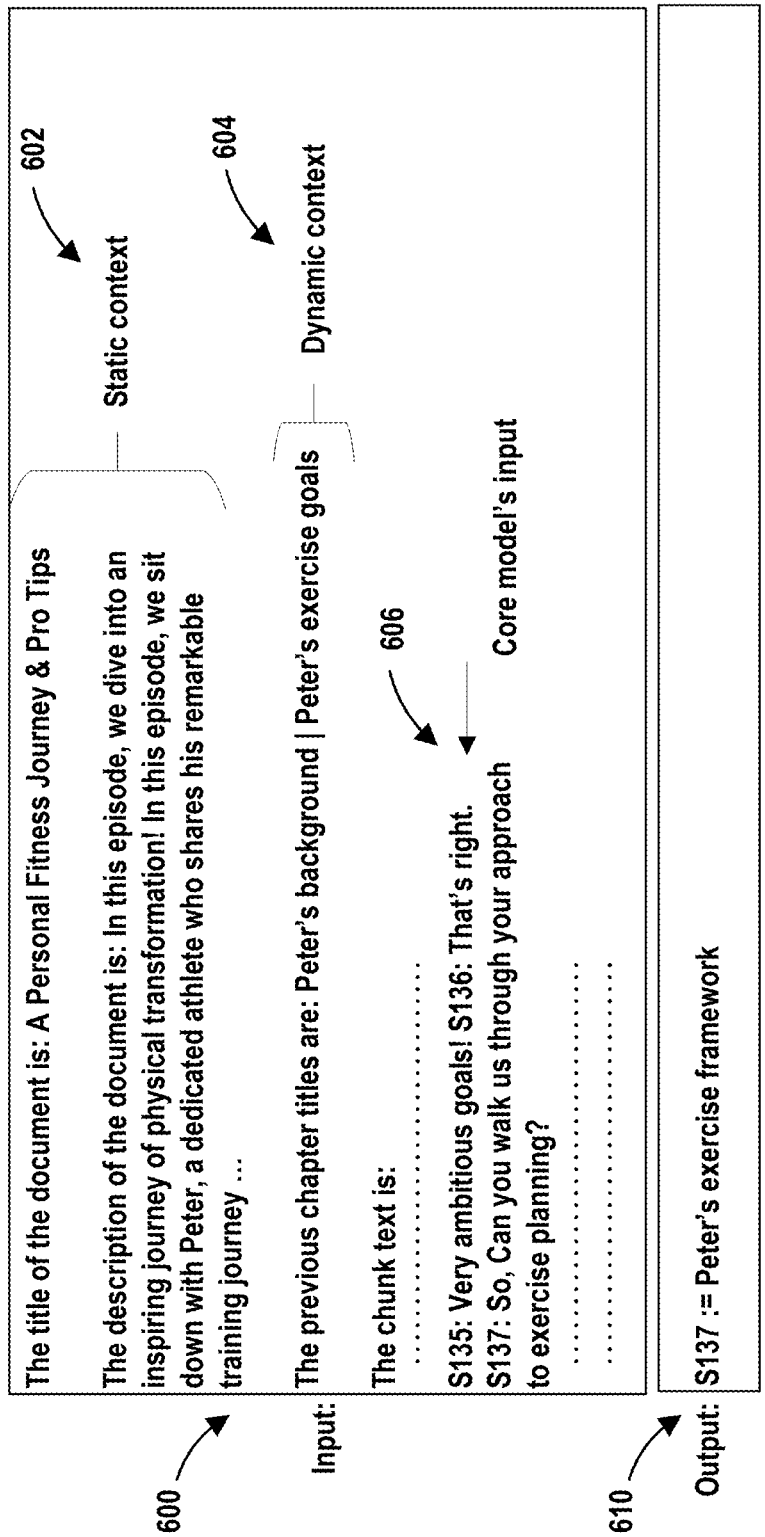
FIG. 6 depicts input to and output from a natural language model, in accordance with example embodiments.

FIG. 6 provides a simplified example of this augmentation. Input 600 to the LLM includes static content 602, dynamic content 604, and chunk text 600 annotated with sentence index numbers. The output 610 represents either the LLM's output given input 600 or supervised training output to be used with input 600. Particularly, output 610 identifies the first sentence of a segment (e.g., sentence S137) and the generated title of the segment (e.g., "Peter's exercise framework"). The ending sentence of the segment is inferred to be the sentence immediately previous to the beginning sentence of the next chronological segment, or the final sentence of the transcript if there are no subsequent segments.

B. Boundary Detection and Title Generation

Turning back to FIG. 4, boundary detection and title generation step 406 may involve applying a trained LLM to each of the augmented chunks (e.g., chunks like input 600), possibly in chronological order. The LLM may be prompted with instructions to consider the textual content of an augmented chunk (e.g., the indexed text of the chunk along with the title of the episode, the description of the episode, and/or the list of previously-inferred segment titles) and identify any segment boundaries therein.

As an example, the LLM may be provided with a prompt such as, "Consider the following text [TEXT OF CHUNK]. Associated metadata indicates that the text is from the [EPISODE TITLE] podcast episode and the episode's description is [DESCRIPTION]. Divide the text into topical segments, and generate a semantically descriptive title for each segment." Here, the bracketed terms are replaced by the text of the chunk, the title of the episode, and the description of the episode. In this example, the list of previous segment titles are omitted for purposes of simplicity. In response, the LLM may identify the segments within the chunk and generate a segment title for each. Alternatively, the LLM may be trained specifically for segmentation and titling of podcast transcripts and may not require sophisticated prompting (e.g., the LLM attempts to generate segmentation and titling output from input text by default and with little or no instructions to do so).

Figure 5A:
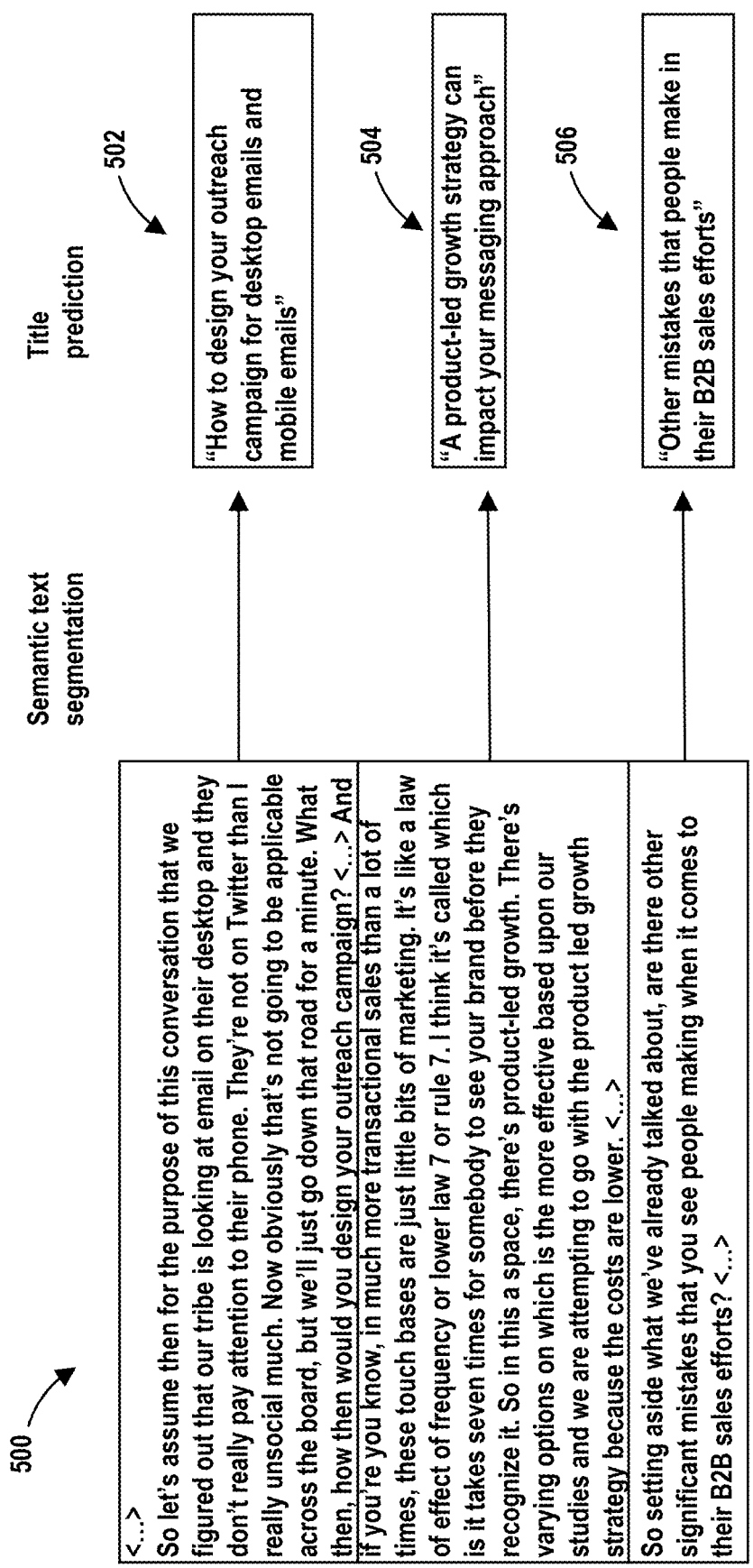
FIGS. 5A and 5B depict segmentation and titling of digital audio content, in accordance with example embodiments.
Figure 5B:
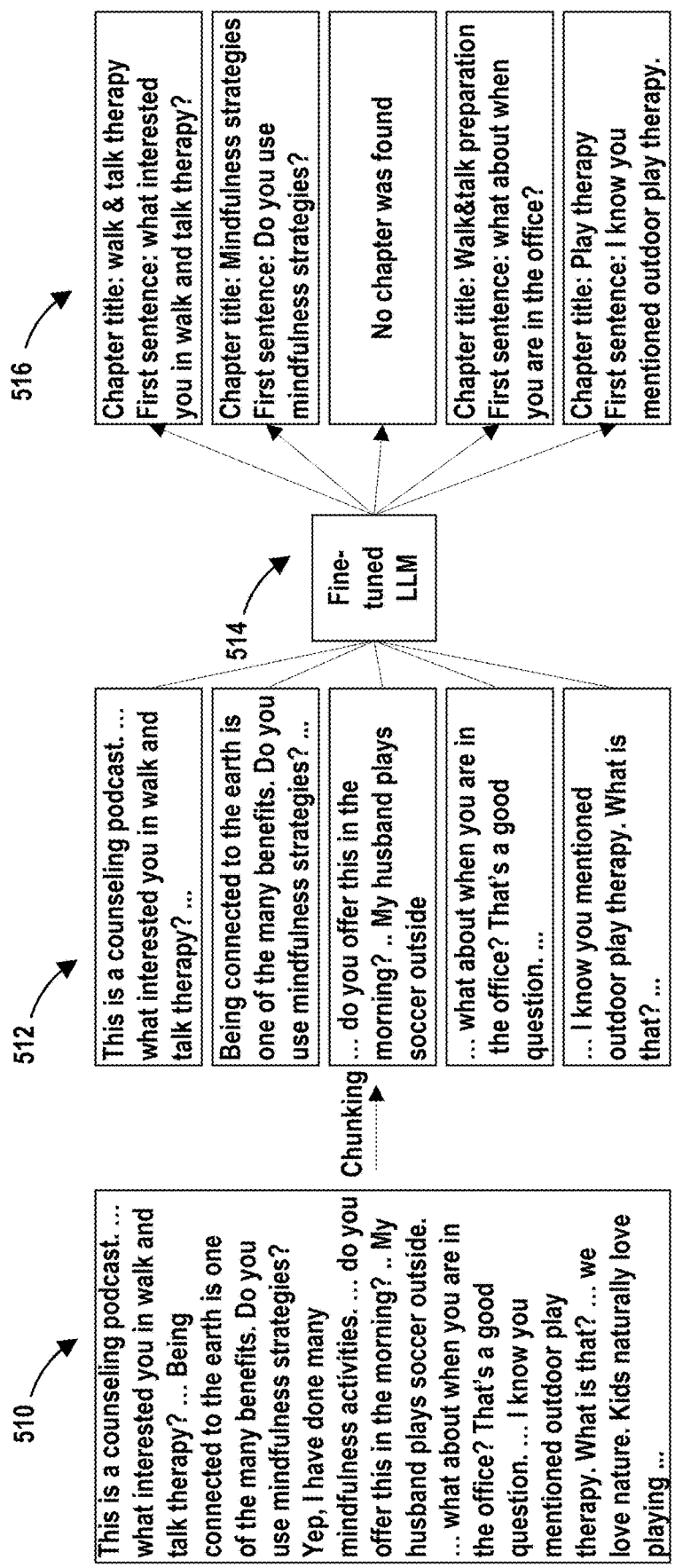

Examples of inputs to and corresponding outputs from an LLM are shown in FIGS. 5A and 5B. Some of these examples omit augmentation for purposes of simplicity. These examples are simple for purposes of illustration, and the amount of text in chunks and segments may be more or less than what is shown.

FIG. 5A depicts podcast transcript 510 having been divided into three segments by using an LLM for semantic text segmentation. Boundaries between the segments are presented as the horizontal lines between the text of podcast transcript 500. The LLM also produces title predictions for each segment, particularly, title 502 for the first segment, title 504 for the second segment, and title 506 for the third segment.

FIG. 5B depicts podcast transcript 500 that is subject to division into chunks 512. Fine-tuned LLM 514 is applied to these chunks to produce segments and segment titles 516. In FIG. 5B, the term "chapter" is used synonymously with the term "segment". Notably, FIG. 5B should not be interpreted to indicate that there must be one segment per chunk. In full generality there may be a many-to-many relationship between segments and chunks. Thus, there may be zero or more segments per chunk and/or zero or more chunks per segment.

C. Post-Processing

Post-processing step 408 as applied to the detected segments and generated segment titles may include one or more of: removal of short segments (less than a configurable length such as 15 or 30 seconds), combining chronologically-adjacent segments with the same or similar titles, and/or removal of segment titles that are logically out of place (e.g., a segment title named "intro" or "introduction" not being the first segment, a segment title named "outro" or "ending" not being the final segment, etc.). This similarity may be determined based on bag of words, term frequency-inverse document frequency (TF-IDF), word embeddings, sentence embeddings, and so on. Such a technique may determine that two segment titles are similar when a similarity metric thereof (e.g., cosine similarity or Jaccard similarity) meets a predetermined threshold value.

Post-processing step 408 may also include removal of segment titles from episodes with too few segments (e.g., less than 3).

Other prost-processing steps may be performed. One possible outcome is shown in FIG. 6, which (as noted above)

illustrates a sample of LLM input 600 and the resulting output 610 after post-processing.

V. LLM Training

Training an LLM to perform the tasks for which it is relied on herein may not be necessary in all cases. Some LLMs may be able to perform these tasks without specifically being trained to do so. However, LLM fine-tuning may improve an LLM's performance at these tasks.

As an example, a corpus of transcripts, augmentations thereof, segments, and segment titles may be used as training data. The segments and segment titles may have been manually or automatically labelled. The LLM may be trained in a manner that teaches (e.g., fine-tunes) it to associate the structure of the segments and segment titles with the transcripts and their augmentations. After being trained with a large enough corpus, the LLM may learn to produce segments and segment titles in accordance with its training data.

VI. Example Operations

Figure 7:
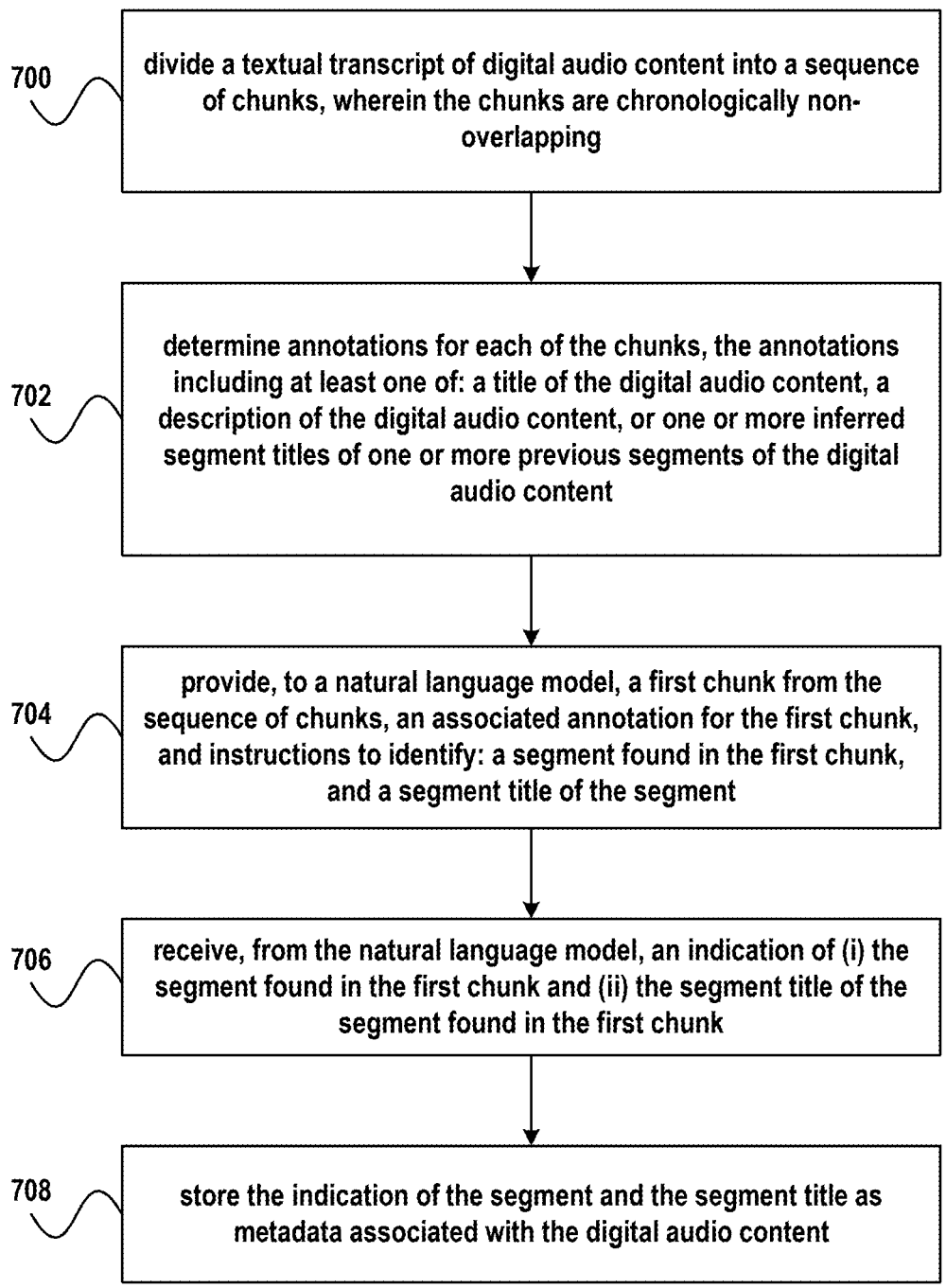
FIG. 7 is a flow chart, in accordance with example embodiments.

FIG. 7 is a flow chart illustrating an example embodiment. The process illustrated by FIG. 7 may be carried out by a computing device, such as media content server 104, and/or one or more additional computing devices arranged to prepare digital audio content. Alternatively, the process can be carried out by other types of devices or device subsystems.

The embodiments of FIG. 7 may be simplified by the removal of any one or more of the features shown therein. Further, these embodiments may be combined with features, aspects, and/or implementations of any of the previous figures or otherwise described herein.

Block 700 may involve dividing a textual transcript of digital audio content into a sequence of chunks, wherein the chunks are chronologically non-overlapping.

Block 702 may involve determining annotations for each of the chunks, the annotations including at least one of: a title of the digital audio content, a description of the digital audio content, or one or more inferred segment titles of one or more previous segments of the digital audio content.

Block 704 may involve providing, to a natural language model, a first chunk from the sequence of chunks, an associated annotation for the first chunk, and instructions to identify: a segment found in the first chunk, and a segment title of the segment.

Block 706 may involve receiving, from the natural language model, an indication of (i) the segment found in the first chunk and (ii) the segment title of the segment found in the first chunk.

Block 708 may involve storing the indication of the segment and the segment title as metadata associated with the digital audio content.

The embodiments of FIG. 7 may be further enhanced by the inclusion of one or more of the features described below. These one or more features may be included in any reasonable combination thereof, including any reasonable subset of the one or more features.

In some embodiments, the annotations also include sequentially-numbered tags pre-pended or post-pended to sentences respectively within each of the chunks.

Some embodiments may include placing boundaries between segments of the digital audio content between sentences in the chunks.

In some embodiments, each of the chunks respectively contains at most as many tokens from the textual transcript as a maximum number of tokens associated with a processing capacity of the natural language model.

In some embodiments, the one or more inferred segment titles are arranged chronologically in the annotations.

In some embodiments, the natural language model comprises a transformer-based language model.

Some embodiments may include: providing, to the natural language model, a second chunk from the sequence of chunks, an associated second annotation for the second chunk, and second instructions to identify: a second segment found in the second chunk, and a second segment title of the second segment; receiving, from the natural language model, a second indication of the second segment and the second segment title; and storing the second indication of the second segment and the second segment title as second metadata associated with the digital audio content.

Some embodiments may include, after receiving the indication of the segment and the segment title, determining that the segment title has a threshold degree of similarity with a further segment title of a further segment that is immediately previous to or immediately following the segment in the digital audio content, combining the segment and the further segment into a common segment, and determining a common title for the common segment based on the segment title and the further segment title.

Some embodiments may include, after receiving the indication of the segment and the segment title, determining that the segment is less than a threshold length and, combining the segment and a further segment into a common segment, wherein the further segment is immediately previous to or immediately following the segment in the digital audio content.

Some embodiments may include indexing, for use by a search engine, the indication of the segment and the segment title as associated with the digital audio content.

In some embodiments, the one or more previous segments are from chronologically-previous chunks of the digital audio content.

VII. Experimental Results

To establish the efficacy of the implementations described herein, a training dataset of approximately 10,000 media content items was used. The training dataset was randomly split into train, validation, and test partitions of approximately 8000, 1000, and 1000 items, respectively. For each item, both the title and description were used as static content. To gauge effectiveness across different domains, two other publicly available datasets were also used.

A model was trained, validated, and tested in accordance with the implementations above. Particularly, a model with a base size of ~220 million parameters was used with transient global attention as the backbone model. Input chunks of up to 8000 words were used, with 7000 words dedicated to the document text and up to 1000 words to the metadata. On average, each transcript in the media content item dataset was broken into 1.75 chunks.

Results from this model were compared with three baseline models that use only text input, including a general LLM with several orders of magnitude more parameters and employing zero-shot learning. The model described herein, with both static and dynamic context enabled, significantly outperforms each of the baseline models. In particular, the new contextual features described above improve the title quality of conversational data as well as boundary accuracy.

Further, integrating global (static and dynamic) context in model input improved the segmentation of long documents that exceed the model's context size.

VIII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of non-transitory computer readable medium such as a storage device including RAM, ROM, a disk drive, a solid-state drive, or another tangible storage medium.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
   dividing a textual transcript of a podcast into a sequence of chunks, wherein the chunks are chronologically non-overlapping;
   determining annotations for each of the chunks, the annotations including at least one of: a title of the podcast, a description of the podcast, or one or more inferred segment titles of one or more previous segments of the podcast;
   providing, to a generative natural language model, a first chunk from the sequence of chunks, an associated annotation, of the annotations, for the first chunk, and instructions to identify: a segment found in the first chunk, and a segment title of the segment found in the first chunk, wherein the generative natural language model includes less than one billion parameters;
   receiving, from the generative natural language model, an indication of (i) the segment found in the first chunk and (ii) the segment title of the segment found in the first chunk; and
   storing the indication of the segment and the segment title as metadata associated with the podcast.

2. The computer-implemented method of claim 1, wherein the annotations also include sequentially-numbered tags pre-pended or post-pended to sentences respectively within each of the chunks.

3. The computer-implemented method of claim 1, wherein each of the chunks respectively contains at most as many tokens from the textual transcript as a maximum number of tokens associated with a processing capacity of the generative natural language model.

4. The computer-implemented method of claim 1, wherein the annotations include the one or more inferred segment titles, and wherein the one or more inferred segment titles are arranged chronologically in the annotations.

5. The computer-implemented method of claim 1, wherein the generative natural language model comprises a transformer-based language model.

6. The computer-implemented method of claim 1, further comprising:
   providing, to the generative natural language model, a second chunk from the sequence of chunks, an associated second annotation for the second chunk, and second instructions to identify: a second segment found in the second chunk, and a second segment title of the second segment;
   receiving, from the generative natural language model, a second indication of the second segment and the second segment title; and
   storing the second indication of the second segment and the second segment title as second metadata associated with the podcast.

7. The computer-implemented method of claim 1, further comprising:
   after receiving the indication of the segment and the segment title, determining that the segment title has a threshold degree of similarity with a further segment title of a further segment that is immediately previous to or immediately following the segment in the podcast, combining the segment and the further segment into a common segment, and determining a common title for the common segment based on the segment title and the further segment title.

8. The computer-implemented method of claim 1, further comprising:
after receiving the indication of the segment and the segment title, determining that the segment is less than a threshold length and, combining the segment and a further segment into a common segment, wherein the further segment is immediately previous to or immediately following the segment in the podcast.

9. The computer-implemented method of claim 1, further comprising:
indexing, for use by a search engine, the indication of the segment and the segment title as associated with the podcast.

10. The computer-implemented method of claim 1, wherein the one or more previous segments are from chronologically-previous chunks of the podcast.

11. The computer-implemented method of claim 1, further comprising:
during playout of the podcast, skipping to the segment found in the first chunk in response to user input.

12. A non-transitory computer-readable medium, having stored thereon program instructions that, upon execution by a computing system, cause the computing system to perform operations comprising:
dividing a textual transcript of a podcast into a sequence of chunks, wherein the chunks are chronologically non-overlapping;
determining annotations for each of the chunks, the annotations including at least one of: a title of the podcast, a description of the podcast, or one or more inferred segment titles of one or more previous segments of the podcast;
providing, to a generative natural language model, a first chunk from the sequence of chunks, an associated annotation, of the annotations, for the first chunk, and instructions to identify: a segment found in the first chunk, and a segment title of the segment found in the first chunk, wherein the generative natural language model includes less than one billion parameters;
receiving, from the generative natural language model, an indication of (i) the segment found in the first chunk and (ii) the segment title of the segment found in the first chunk; and
storing the indication of the segment and the segment title as metadata associated with the podcast.

13. The non-transitory computer-readable medium of claim 12, the operations further comprising:
placing boundaries between segments of the podcast between sentences in the chunks.

14. The non-transitory computer-readable medium of claim 12, wherein each of the chunks respectively contains at most as many tokens from the textual transcript as a maximum number of tokens associated with a processing capacity of the generative natural language model.

15. The non-transitory computer-readable medium of claim 12, the operations further comprising:
providing, to the generative natural language model, a second chunk from the sequence of chunks, an associated second annotation for the second chunk, and second instructions to identify: a second segment found in the second chunk, and a second segment title of the second segment;
receiving, from the generative natural language model, a second indication of the second segment and the second segment title; and
storing the second indication of the second segment and the second segment title as second metadata associated with the podcast.

16. The non-transitory computer-readable medium of claim 12, the operations further comprising:
after receiving the indication of the segment and the segment title, determining that the segment title has a threshold degree of similarity with a further segment title of a further segment that is immediately previous to or immediately following the segment in the podcast, combining the segment and the further segment into a common segment, and determining a common title for the common segment based on the segment title and the further segment title.

17. The non-transitory computer-readable medium of claim 12, the operations further comprising:
after receiving the indication of the segment and the segment title, determining that the segment is less than a threshold length and, combining the segment and a further segment into a common segment, wherein the further segment is immediately previous to or immediately following the segment in the podcast.

18. The non-transitory computer-readable medium of claim 12, the operations further comprising:
during playout of the podcast, skipping to the segment found in the first chunk in response to user input.

19. A system comprising:
one or more processors; and
memory, containing program instructions that, upon execution by the one or more processors, cause the system to perform operations comprising:
dividing a textual transcript of a podcast into a sequence of chunks, wherein the chunks are chronologically non-overlapping;
determining annotations for each of the chunks, the annotations including at least one of: a title of the podcast, a description of the podcast, or one or more inferred segment titles of one or more previous segments of the podcast;
providing, to a generative natural language model, a first chunk from the sequence of chunks, an associated annotation, of the annotations, for the first chunk, and instructions to identify: a segment found in the first chunk, and a segment title of the segment found in the first chunk, wherein the generative natural language model includes less than one billion parameters;
receiving, from the generative natural language model, an indication of (i) the segment found in the first chunk and (ii) the segment title of the segment found in the first chunk; and
storing the indication of the segment and the segment title as metadata associated with the podcast.

20. The system of claim 19, the operations further comprising:
during playout of the podcast, skipping to the segment found in the first chunk in response to user input.

* * * * *